Dec. 21, 1948.  R. GOLDBERG  2,456,696
VARIABLE PITCH FLUID TRANSMISSION
Filed Oct. 8, 1945  3 Sheets-Sheet 1
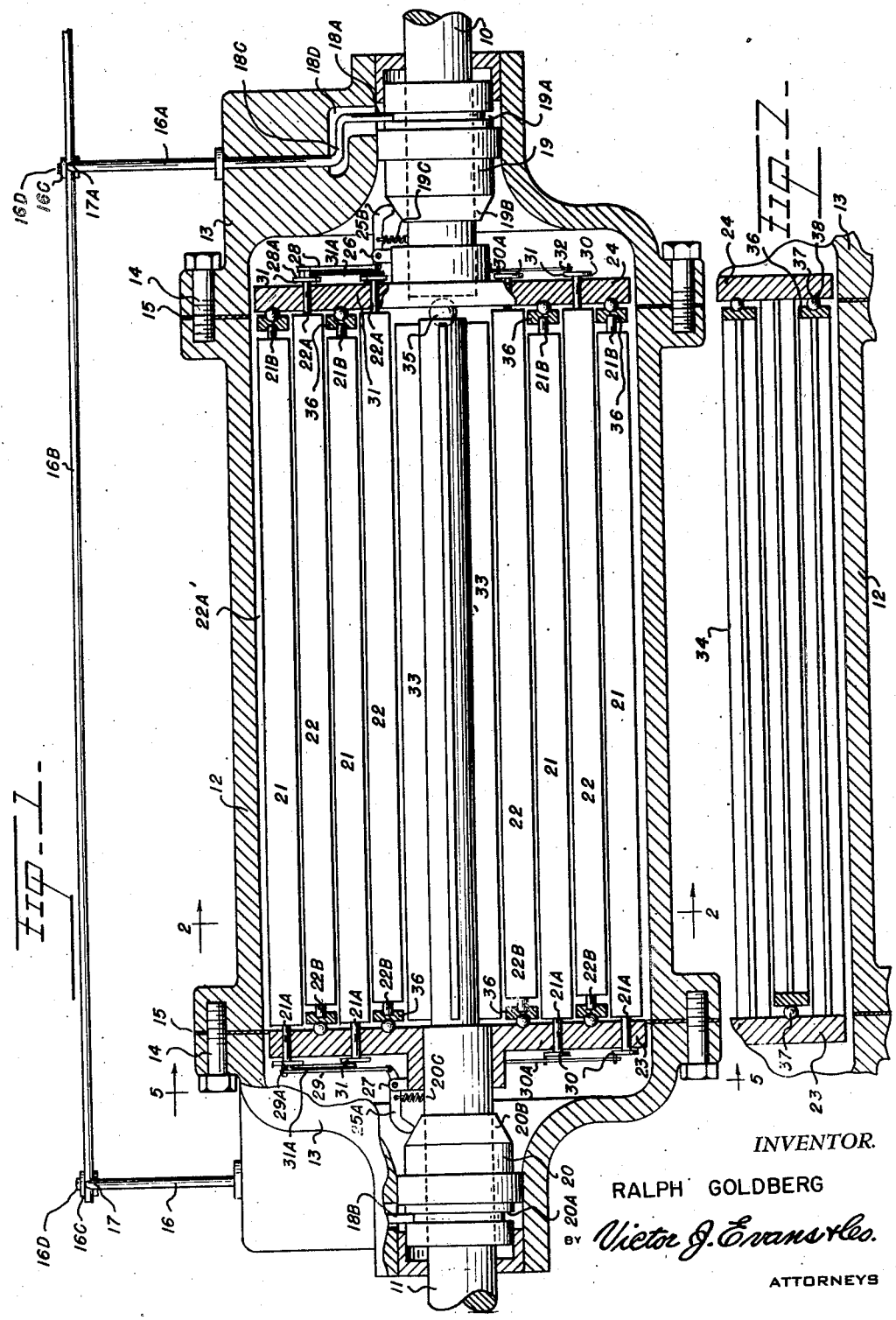
INVENTOR.
RALPH GOLDBERG
BY Victor J. Evans & Co.
ATTORNEYS Dec. 21, 1948.    R. GOLDBERG    2,456,696
VARIABLE PITCH FLUID TRANSMISSION
Filed Oct. 8, 1945    3 Sheets-Sheet 2
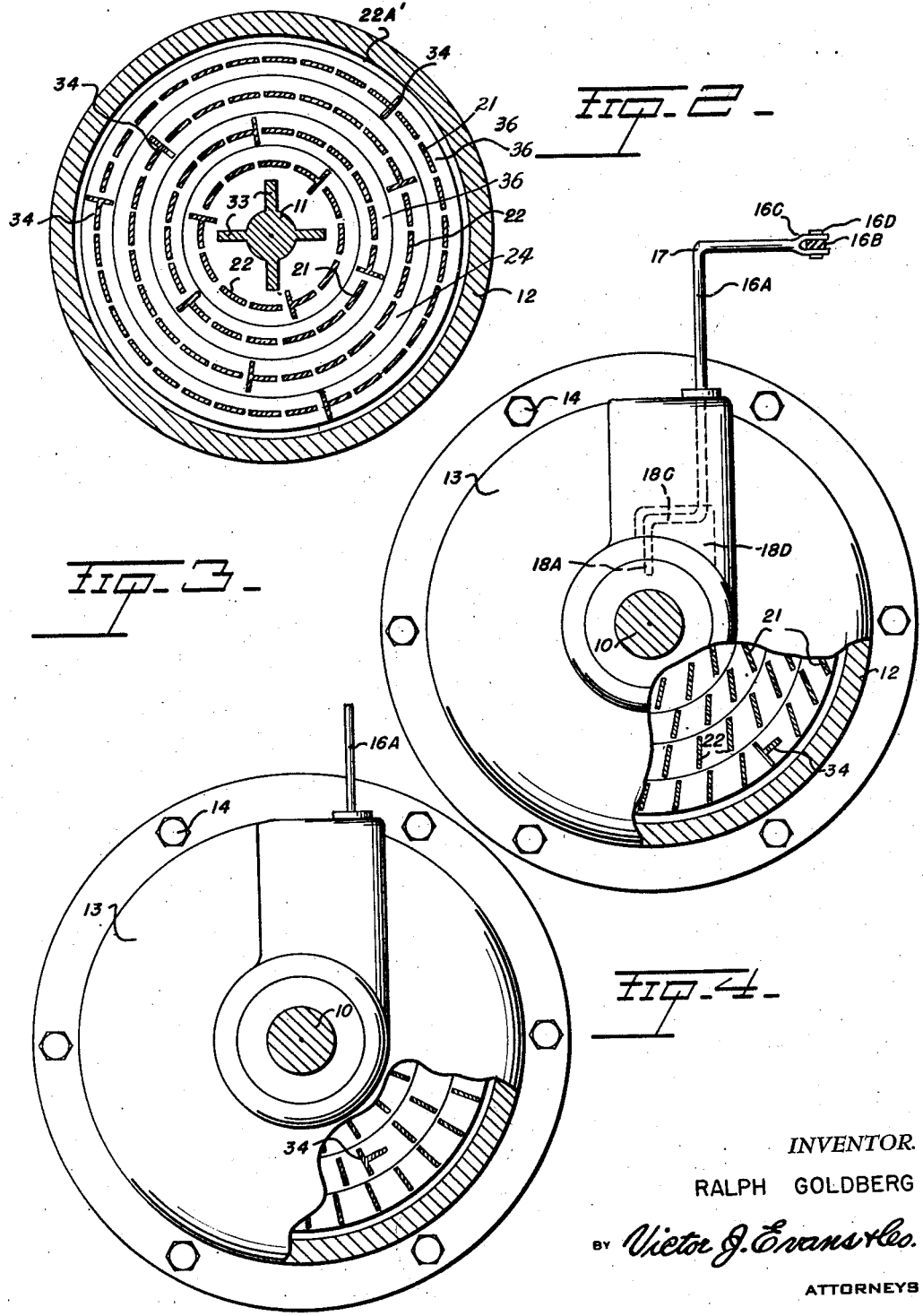
INVENTOR.
RALPH GOLDBERG
BY *Victor J. Evans & Co.*
ATTORNEYS Dec. 21, 1948.  R. GOLDBERG  2,456,696
VARIABLE PITCH FLUID TRANSMISSION
Filed Oct. 8, 1945  3 Sheets-Sheet 3

INVENTOR.
RALPH GOLDBERG
BY *Victor J. Evans & Co.*
ATTORNEYS

Patented Dec. 21, 1948

2,456,696

UNITED STATES PATENT OFFICE 2,456,696

VARIABLE PITCH FLUID TRANSMISSION

Ralph Goldberg, Baltimore, Md., assignor of one-half to Joseph H. Colvin, Baltimore, Md.

Application October 8, 1945, Serial No. 620,989

5 Claims. (Cl. 192—58)

This invention relates to power transmission in automobiles and more particularly to a clutchless fluid transmission therefor.

Fluid drive transmissions of the conventional type comprise a fluid-filled cylinder secured about the ends of a split in the drive-shaft of the automobile and having a fan in either end thereof attached to each of said axles. In such transmissions it is impossible to regulate the power output of the motor by means of a fluid drive alone and it is therefore necessary to employ the conventional gears, gear lever and clutch.

It is the object of this invention to provide clutchless fluid drive transmission which transfers power by means of interlaced vanes of variable pitch and having many accompanying advantages.

By means of the variable pitch vanes of the present invention, which can be moved to a slippage or no-power position it is possible to employ a denser and more desirable weight of fluid than can be used in conventional systems, since in a no-power position the resistance of the vanes or blades causes much less resistance than the fan formerly used enabling the stopping of the car while the engine is still idling. A denser fluid in the present system would necessitate a greater pressure exerted by the driver on the brake pedal in order to stop the car.

The use of a denser fluid, which the roto-vane unit makes possible, adds to the percentage of power transmission to the wheels.

The roto-vane unit also embodies the desirable free-wheeling feature since when the driver releases the accelerator pedal the vanes move into a no-power and streamlined free-slippage position.

In its broad aspects the invention comprises interlacing rotating vanes of variable pitch, connected to a driving shaft in a fluid-tight housing, rotating the fluid therein, and other interlacing rotating vanes, also of variable pitch, connected to a driven shaft and rotating in response to the rotation of the fluid.

The invention will be better understood from the following detailed description thereof with reference to the accompanying drawings in which:

Figure 1 is a side cross-sectional view of the roto-vane unit;

Figure 2 is an end cross-sectional view showing a no-power position of the vanes thereof;

Figure 3 is an end view, partly in cross-section, showing semi-power position of the vanes thereof;

Figure 4 is an end view, partly in cross-section, showing full power position of vanes thereof;

Figure 7 is a fragmentary detailed sectional view of the rings and supports for the rings.

Figure 5:
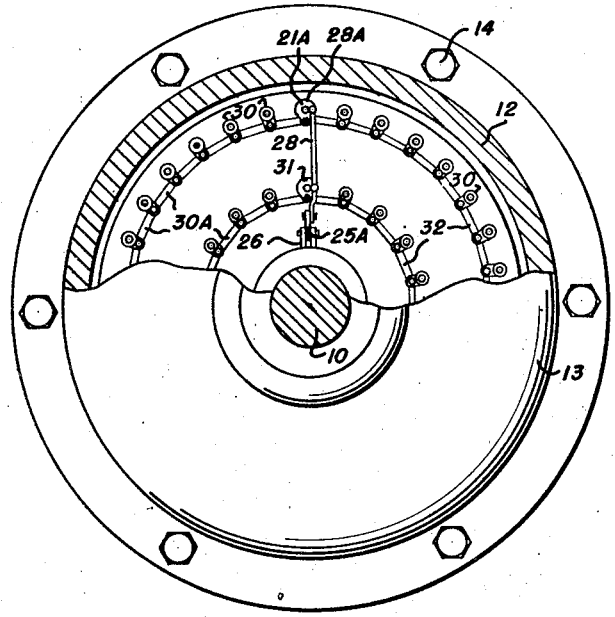
Figure 5 is an end view of the roto-vane housing, partly in cross-section, showing the vane-rotating system thereof.
Figure 6:
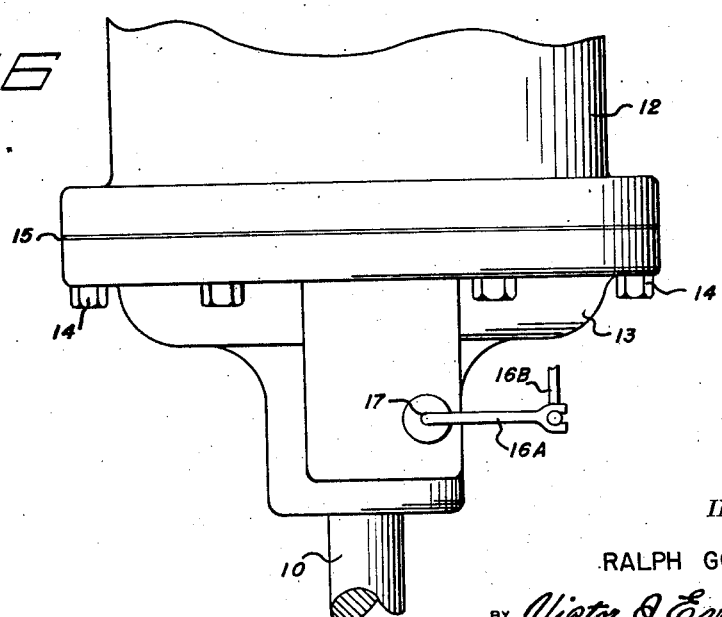
Figure 6 is a top view of an end section thereof.

The apparatus comprising the roto-vane unit includes a motor driven shaft 10, ordinarily the drive-shaft of an automobile, for transmitting power to shaft 11 and thence to the rear wheels of the automobile, not shown.

A metal housing 12 is mounted about the ends of shafts 10 and 11 by means of housing ends 13 to which housing 12 is secured by means of bolts 14, the point being filled by fluidtight rubber gaskets 15.

Shafts 16 and 16a having forked bifurcated ends 16c are connected to the automobile accelerator pedal by means of rod 16b, which is secured in the ends 16c by a pin 16d. The shafts 16 and 16a extend through the ends 13 of the housing and have right angle bends 17 and 17a, which are provided in the shafts 16 and 16a so that a longitudinal motion of rod 16b will effect a rotation of shafts 16 and 16a causing their respective ends 18a and 18b to effect longitudinal movements of sleeve cams 19 and 20 by means of the cranks 18c in shafts 16 and 16a which are free to rotate in space 18d.

Cams 19 and 20 slide on shafts 10 and 11 and are engaged for movement in grooves 19a and 20a by ends 18a and 18b of shafts 16 and 16a.

Driven vanes 21 and driving vanes 22 rotating in any suitable fluid 22a, such as oil, are mounted on flywheels 23 and 24 and are rotated by means of the sliding of cams 19 and 20 since the cams 19 and 20 have beveled ends 19b and 20b for actuating rocker arms 25a and 25b pivotally mounted at 26 and 27 on flywheels 23 and 24 respectively and the rocker arms are retained in contact with the cam ends 19b and 20b by springs 19c and 20c respectively.

The inward ends of rocker arms 25a and 25b each have metal vane-rods 28 and 29 respectively pivotally secured thereto and attached at their other ends to eccentric means 28a and 29a which are attached to one of the vane axles 21a and 22a respectively, as shown in Figure 5. The said eccentric means 28a and 29a are secured to one of the metal vane axles 21a and the eccentric means 28a and 29a are connected to the eccentrics 31 by links 31a. Each of the axles 21a are provided with arms 30 which are interconnected by links 30a so that movement of the eccentric means 28a will actuate the vanes 22 in unison, since the eccentrics and arms are all pivotally connected to the links 30a.

The vane rods 28 and 29 connected to the axles 21a and 22a by eccentrics 28a and 29a respectively cause the actuation of the vanes 21 and 22 in response to actuation of the rods 28 and 29 by rocker arms 25a and 25b which in turn are actuated by a sliding inward movement of cams 19 and 20 when actuated by means of shafts 16a in turn actuated by the rod 16b caused by motion of the accelerator pedal.

A central set of rotating vanes 33 is attached to the driven shaft 11 which rotates against ball bearing 35 seated in the driving flywheel 24. The central vanes 33 are of non-variable pitch. A plurality of supports 34 are provided and each of the supports 34 does not rotate about its longitudinal axis, but is secured to the confronting flywheels and rings as subsequently described.

The driven shaft end of the driving vanes and the driving shaft end of the driven vanes are provided with axles 21b and 22b respectively which are journalled in annular rings 36 which are alternately connected to flywheels 23 and 24 by supports 34 so that while the outer ring 36 is connected to one flywheel, the next ring will be connected to the opposite flywheel and so on alternately and the outer sides of the rings 36 and the inner side of the flywheels 23 and 24 are complementary grooved at 38 to the shape of ball bearings 37 as shown in Figure 7.

Referring specifically to Figures 1, 2 and 7 of the drawings, it will be seen that a first group of concentric rings 36 is arranged adjacent to and spaced from the flywheel 24, there being ball bearings 37 rotatably positioned between the rings 36 and the adjacent flywheel 24, so that the rings 36 are free to rotate with respect to the flywheel 24. Extending between each of these rings 36 and the other flywheel 23 and secured thereto is a first set or plurality of T-shaped supports 34 for maintaining the rings 36 in spaced, parallel relation with respect to the complemental flywheels 23 and 24. Arranged adjacent to and spaced from the other flywheel 23 is a second group of concentric rings 36, there being ball bearings 37 rotatably positioned between the rings 36 and the adjacent flywheel 23. Extending between each of the rings 36 in this second group of rings and the flywheel 24 and secured thereto is a plurality or second set of T-shaped supports 34 for maintaining the second group of rings in spaced, parallel relation with respect to the complemental flywheels 23 and 24.

The following steps are included in the operation of the device as applied to an automobile.

Upon entering an automobile the ignition is turned on and the self-starter is used. This causes the motor to idle and the car is ready for motion.

The emergency brake is then released and the foot is pressed on the accelerator. No clutch or gear shift lever is used in this operation, as the foot is pressed on the accelerator shafts 16 and 16a connected to the accelerator by rod 16b actuate the cams 19 and 20 on the shafts 10 and 11. As these cams slide on the shafts they contact and raise rocker arms 25a and 25b. The arms by means of rods 28 and 29 and eccentrics 28a and 29a begin to rotate vanes 21 and 22 from neutral position, see Figure 2, gradually to semi-power position, see Figure 3, as this is occurring the automobile engine is running faster and is driving shaft 10. Shaft 10 is rotating flywheel 24, flywheel 24 is rotating its driving or impeller vanes 22, rings 36, and supports 34. This action is whirling fluid 22a around in circular motion in housing 12, the whirling fluid exerts pressure on the driven or following vanes 21 which in turn exerts pressure on flywheel 23, rings 36 and supports 34 connected thereto. The accelerator is gradually depressed until vanes 21 and 22 are in full power position. See Figure 4. From this point additional pressure on accelerator causes no change in vanes' positions. It merely causes engine of car to run faster which causes driving vanes 22 to rotate more rapidly which in turn causes the fluid 22a to move faster and this action causes the driven vanes 21 to rotate faster. This faster rotation of vanes 21 makes the wheels of the car to turn faster through medium of flywheel 23 and shaft 11.

The automobile will gain momentum and move forward to its maximum speed. This speed is comparable to the conventional high speed gear. All that is necessary to slow down or come to a complete stop is the removal of the foot from the accelerator and the application of the brakes. When resuming motion remove the foot from brake and use accelerator. This does not involve the use of any gears or clutches whatsoever.

Although the present embodiment of the invention is described in detail it is to be understood that the invention is not to be limited to the details of construction and the specific arrangement of parts herein illustrated and described as the invention obviously may take other forms. It is also to be understood that the phraseology or terminology herein employed is for the purpose of description and not of limitation.

Having thus described the invention what is claimed as new and desired to be secured by Letters Patent is:

1. In a vehicle power transmission, a housing containing hydraulic fluid therein, a driving shaft rotatably supported in one end of said housing and adapted to be connected to a power source, a driven shaft rotatably supported in the other end of said housing, a plurality of driving vanes arranged longitudinally in said housing and operatively connected to said driving shaft for imparting a rotary motion to said fluid when said driving shaft is rotated, a plurality of driven vanes arranged longitudinally in said housing and operatively connected to said driven shaft for rotating the latter in response to rotation of said fluid, and means operatively connected to each of said driving and driven vanes for varying the pitch of the latter.

2. In a vehicle power transmission, a housing containing hydraulic fluid therein, a driving shaft rotatably supported in one end of said housing and adapted to be connected to a power source, a driven shaft rotatably supported in the other end of said housing, a plurality of driving vanes arranged longitudinally in said housing and operatively connected to said driving shaft for imparting a rotary motion to said fluid when said driving shaft is rotated, a plurality of driven vanes arranged longitudinally in said housing and operatively connected to said driven shaft for rotating the latter in response to rotation of said fluid, said driving and driven vanes being arranged in annular concentric relation with respect to each other, and means operatively connected to each of said driving and driven vanes and operable from without said housing for varying the pitch of the latter.

3. In a vehicle power transmission, a housing containing hydraulic fluid therein, a driving shaft rotatably supported in an end of said housing and adapted to be connected to a power source, a rotatable driven shaft extending longitudinally in said housing, a first flywheel positioned within said housing and secured to said driving shaft, a second flywheel in said housing arranged in spaced parallel relation with respect to said first flywheel and secured to said driven shaft, a plurality of driving vanes arranged longitudinally in said housing and operatively connected to said first flywheel for imparting a rotary motion to said fluid when said driving shaft is rotated, a plurality of driven vanes arranged longitudinally in said housing and operatively connected to said second flywheel for rotating said driven shaft in response to rotation of said fluid, said driving and driven vanes being arranged in concentric relation with respect to each other, a set of fixed vanes arranged longitudinally along said driven shaft and secured to the latter, and means operatively connected to each of said driving and driven vanes and operable from without said housing for varying the pitch of the latter.

4. In a vehicle power transmission, a housing containing hydraulic fluid therein, a driving shaft rotatably supported in an end of said housing and adapted to be connected to a power source, a rotatable driven shaft extending longitudinally in said housing, a first flywheel positioned within said housing and secured to said driving shaft, a second flywheel in said housing arranged in spaced parallel relation with respect to said first flywheel and secured to said driven shaft, a first set of concentric rings arranged adjacent said first flywheel and spaced from the latter, a plurality of T-shaped supports secured to said rings and to said second flywheel for maintaining said rings in spaced, parallel relation with respect to said second flywheel, a second set of concentric rings arranged adjacent said second flywheel and spaced from the latter, a plurality of T-shaped supports secured to the rings in said second set of rings and to said first flywheel for maintaining said second set of rings in spaced, parallel relation with respect to said first flywheel, a plurality of driving vanes arranged longitudinally in said housing and operatively connected to said first flywheel and to the rings of said second set of rings for imparting a rotary motion to said fluid when said driving shaft is rotated, a plurality of driven vanes arranged longitudinally in said housing and operatively connected to said second flywheel and to the rings of said first set of rings for rotating said driven shaft in response to rotation of said fluid, a set of fixed vanes arranged longitudinally along said driven shaft and secured to the latter, and means operatively connected to each of said driving vanes operable from without said housing for varying the pitch of said driving vanes.

5. In a vehicle power transmission, a housing containing hydraulic fluid therein, a driving shaft rotatably supported in an end of said housing and adapted to be connected to a power source, a rotatable driven shaft extending longitudinally in said housing, a first flywheel positioned within said housing and secured to said driving shaft, a second flywheel in said housing arranged in spaced parallel relation with respect to said first flywheel and secured to said driven shaft, a first set of concentric rings arranged adjacent said first flywheel and spaced from the latter, a plurality of T-shaped supports secured to said rings and to said second flywheel for maintaining said rings in spaced, parallel relation with respect to said second flywheel, a second set of concentric rings arranged adjacent said second flywheel and spaced from the latter, a plurality of T-shaped supports secured to the rings in said second set of rings and to said first flywheel for maintaining said second set of rings in spaced, parallel relation with respect to said first flywheel, a plurality of driving vanes arranged longitudinally in said housing and operatively connected to said first flywheel and to the rings of said second set of rings for imparting a rotary motion to said fluid when said driving shaft is rotated, a plurality of driven vanes arranged longitudinally in said housing and operatively connected to said second flywheel and to the rings of said first set of rings for rotating said driven shaft in response to rotation of said fluid, a set of fixed vanes arranged longitudinally along said driven shaft and secured to the latter, means operatively connected to each of said driving vanes operable from without said housing for varying pitch of said driving vanes, and means operatively connected to each of said driven vanes operable from without said housing for varying the pitch of said driven vanes.

RALPH GOLDBERG.

REFERENCES CITED

The following references are of record in the file of this patent:

UNITED STATES PATENTS

| Number | Name | Date |
| --- | --- | --- |
| 1,129,720 | Patterson | Feb. 23, 1915 |
| 1,258,468 | Rounds | Mar. 5, 1918 |
| 1,965,109 | Rudquist | July 3, 1934 |
| 2,073,357 | Wemp | Mar. 9, 1937 |
| 2,200,596 | Dodge | May 14, 1940 |
| 2,357,654 | Horton | Sept. 5, 1944 |